United States Patent
Ashton et al.

(12) 
(10) Patent No.: US 6,425,220 B1
(45) Date of Patent: *Jul. 30, 2002

(54) CONTINUITY TIE

(75) Inventors: Roger Wall Ashton, Orinda; Robert Donald Lucey, Lafayette; John Duncan Pryor, Oakland, all of CA (US)

(73) Assignee: Zone Four, LLC, San Leandro, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/621,381

(22) Filed: Jul. 21, 2000

Related U.S. Application Data

(63) Continuation of application No. 09/305,636, filed on May 5, 1999, now Pat. No. 6,112,486, which is a continuation of application No. 09/056,279, filed on Apr. 7, 1998, now Pat. No. 5,921,042, which is a continuation of application No. 08/517,299, filed on Aug. 21, 1995, now Pat. No. 5,813,181.

(51) Int. Cl.$^7$ .............................................. E04G 23/00
(52) U.S. Cl. ...................... 52/291; 52/167.3; 52/223.9; 52/655.1; 52/698; 52/739.1; 52/745.06; 52/741.1; 403/217; 403/218; 403/170; 403/176; 248/354.6
(58) Field of Search .............................. 52/127.2, 223.1, 52/223.7, 223.9, 223.11, 291, 653.2, 655.1, 643, 698; 403/57, 74, 79, 84, 91, 103, 150, 157, 170, 176, 262, 335, 337, 218; 248/354.3, 354.6

(56) References Cited

U.S. PATENT DOCUMENTS

| | | |
|---|---|---|
| 1,054,175 A | 2/1913 | Coffin |
| 1,474,660 A | 11/1923 | White |
| 3,264,021 A | 8/1966 | Artman |
| 3,837,754 A | 9/1974 | Malcik |
| 4,129,975 A | 12/1978 | Gabriel |
| 4,271,654 A | 6/1981 | Jungbluth |
| 4,611,948 A | 9/1986 | Johnson |
| 4,616,950 A | 10/1986 | Morris |
| 4,701,065 A | 10/1987 | Otosa |
| 4,893,961 A | 1/1990 | O'Sullivan et al. |
| 5,092,096 A | 3/1992 | Cornell |

(List continued on next page.)

*Primary Examiner*—Carl D. Friedman
*Assistant Examiner*—Yvonne M. Horton
(74) *Attorney, Agent, or Firm*—Knobbe, Martens, Olson & Bear LLP

(57) ABSTRACT

A continuity tie for providing both tension and compression resistance to externally induced movement of building structural members. A central body member is provided with a plurality of bolt mounting apertures in a staggered pattern and a pair of end plates having a rod aperture. One embodiment employs a tubular central body member having a hollow interior; another embodiment employs a generally U-shaped central portion with flanking flanges. Both embodiments can be mounted to building structural members separated by an intervening building structural member, with the continuity ties being secured together by means of a single rod arranged in the rod apertures in each continuity tie and secured in place by means of nuts. The staggered bolt patterns reduce the probability of mounting all bolts in a defect region of a timber building element. The hollow tube embodiment is symmetric and cannot be installed backwards. The rod aperture may be centered or offset from the central axis of the continuity tie. In the hollow tubular embodiment, the rod aperture is offset so that the continuity tie can be mounted with the rod aperture closest to the building structural member to reduce the force couple therebetween or with the rod aperture farthest from the building structural member to provide clearance between the rod and other hardware mounted to the building structural member.

30 Claims, 4 Drawing Sheets

U.S. PATENT DOCUMENTS

| | | |
|---|---|---|
| 5,228,261 A | 7/1993 | Watkins |
| 5,249,404 A | 10/1993 | Leek et al. |
| 5,367,852 A | 11/1994 | Masuda et al. |
| 5,575,129 A | 11/1996 | Goto |
| 5,678,375 A | 10/1997 | Juola |
| 5,809,719 A | 9/1998 | Ashton et al. |
| 5,813,181 A * | 9/1998 | Ashton et al. ............... 52/291 |
| 5,921,042 A * | 7/1999 | Ashton et al. ............... 52/291 |
| 5,992,126 A * | 11/1999 | Ashton et al. ........... 52/745.06 |
| 6,112,486 A * | 9/2000 | Ashton et al. ............... 52/291 |
| 6,115,019 A * | 12/2000 | Ashton et al. ............. 52/739.1 |

* cited by examiner

CONTINUITY TIE

The present application is a continuation of U.S. application Ser. No. 09/305,636, filed May 5, 1999, issued as U.S. Pat. No. 6,112,486 on Sep. 5, 2000, which is a continuation of U.S. application Ser. No. 09/056,279, filed Apr. 7, 1998, issued as U.S. Pat. No. 5,921,042 on Jul. 13, 1999, which is a continuation of U.S. application Ser. No. 08/517,299, filed Aug. 21, 1995, issued Sep. 29, 1998 as U.S. Pat. No. 5,813,181.

BACKGROUND OF THE INVENTION

This invention relates to building construction and reinforcement in general, and to an improved continuity tie and continuity system for strengthening the performance of building structures in response to forces generated by seismic waves and other external forces.

A continuity tie is part of a continuity system which is an integral part of a building's structural roof or floor system specifically designed to resist lateral forces from events such as earthquakes, wind, or blast. A continuity system generally consists of a plurality of spaced continuity lines that extend completely across both the length and width of a building. The purpose of a continuity system is to provide for a discrete structural mechanism for the transference of loads through a roof or floor diaphragm, such as for the transference of lateral forces that might be generated by a concrete wall panel during an earthquake to the structural elements intended to resist such forces.

In buildings with timber framed roofs and floors, and plywood diaphragms, continuity lines often incorporate otherwise required structural members such as purlins or glulam beams. In the absence of an element that is specifically designed to connect these members to form a continuity line, the forces normally transferred through the continuity line are transferred through the plywood diaphragm. At those locations where the plywood is discontinuous across a structural member the continuity forces are transferred via a mechanism that incorporates the nailing between the plywood and the structural member. Such a load transfer mechanism subjects the plywood nailing to out-of-plane loading and the structural member to cross grain tension. The nailing along the edges of a sheet of plywood is generally intended to resist only in-plane loading (parallel to the plywood sheet edges), and is prone to damage or failure when subjected to out-of-plane loading. Typically the cross grain tensile capacity of timber is poor and load transfer mechanisms that subject a timber element to cross grain tension are prone to failure. In areas subject to high seismicity or wind loads, the deficiencies associated with continuity systems that only incorporate the roof and/or floor diaphragms are understood, and buildings are generally designed with continuity systems that incorporate the structural roof and/or floor framing members into discrete continuity lines with continuity ties interconnecting these members. A common specifically designed continuity tie is some type of bolted assembly.

The bolted assembly commonly used as a continuity tie is referred to as a holdown. An example of a holdown connection device is disclosed in U.S. Pat. No. 5,249,404, the disclosure of which is hereby incorporated by reference. The holdown was originally designed to connect a vertical structural member (e.g. an end post for a shear wall) to a horizontal structural member (e.g. a floor or foundation) thus providing holdown restraint for the vertical member.

Although holdowns may be incorporated into a continuity tie, such connection devices are subject to various inadequacies. These inadequacies are as follows:

Holdown connection devices are generally designed for overall load capacity without regard to overall device deflection. Such connection devices are subject to substantial deflections when loaded. Recent studies of earthquake damaged buildings have recommended that the device deflection of connection devices incorporated in continuity ties be limited in order to allow the continuity tie forces to effectively be transferred through the roof and/or floor diaphragms, and to keep the timber roof and/or floor framing elements from slipping out of their end support devices (joist or purlin hangers). Some building departments have taken these recommendations and have established their own device deflection criteria. One such criterion put forth by the city of Los Angles has reduced the allowable capacity of a holdown device by a factor generally between three and five. Such criteria increases the size, number, and cost of installing continuity ties with holdown connection devices.

Additionally, the design of a holdown connection device is such that all the bolt holes that attach the connection device to the wood structural member are in line thus bearing on the same "grain line" of the wood member. Not only does this accentuate the load on the wood structural member, but if this particular grain line happens to have an abnormality that cannot fully resist the load from the holdown connection device, this particular connection may be compromised and prone to failure.

Another deficiency of the holdown connection device is that the bolt holes bored through the wood member are prone to being oversized, especially in paired applications. Connection devices installed with oversized bolt holes must undergo an additional amount of deflection before the "slop" between the bolt and the wood is taken up. Such deflections affect the structural performance of a building in a manner similar to the deflections associated with a holdown connection device. Recent studies of earthquake damaged buildings have recommended that connection devices to be used in paired applications for continuity ties be installed with drill jigs in order to mitigate the potential for overdrilled bolt holes.

A holdown connection device is generally designed to resist only tension forces between two connected members, and not compression forces. Continuity ties incorporating holdown connection devices typically require that the end bearings between the structural members to be connected and the interceding member be shimmed tight in order to provide compression load capacity. Such shimming is an additional expense to the installation of a continuity tie.

Although there are other deficiencies in the holdown hardware, especially as it compares to the subject invention, these are perhaps the most significant.

SUMMARY OF THE INVENTION

The invention comprises a continuity tie and continuity tie system which is devoid of the above noted disadvantages, which is relatively simple to fabricate and install, and which can be easily retrofitted into existing building structures to improve the continuity system.

From an individual apparatus aspect, the invention comprises a continuity tie for securing together in both tension and compression resistive manner a pair of building structural members having mounting surfaces. The continuity tie includes a central body member having opposing ends and a plurality of bolt mounting apertures distributed in a predetermined pattern, and a pair of end plates each secured to a different one of the opposing ends. Each end plate is provided with a rod mounting aperture offset from the center thereof. In a first embodiment, the central body member is a tubular structure having front and back walls, and the bolt mounting apertures are formed in the front and back walls. In a second embodiment, the central body member has a center U-shaped region and a pair of flange portions flanking the center U-shaped region, and the bolt mounting apertures are formed in the flanges.

From a system aspect, the invention comprises a continuity tie system for securing together in tension and compression resistive manner a pair of building structural members having surfaces. The continuity tie system comprises a pair of continuity ties each comprising a central body member having opposing ends and a plurality of bolt mounting apertures distributed in a predetermined pattern, and a pair of end plates each secured to a different one of the opposing ends. The end plates are provided with a rod mounting aperture either centered or offset from the center thereof. The continuity tie system further includes a threaded rod received within the rod mounting aperture of each of the pair of continuity ties, with the threaded rod being secured to each continuity tie. The pair of continuity ties are separated by an intervening building structural member. The continuity ties are secured by means of bolts passing through the bolt mounting apertures and corresponding apertures formed in the pair of building structural members. The threaded rod extends through an aperture formed in the intervening building structural member. The continuity tie system may employ either one of the two embodiments of the individual continuity ties. The continuity tie system may be configured in a single-sided manner with each continuity tie mounted to essentially co-planar mounting surfaces of the pair of building structural members, or in a double-sided configuration employing two pairs of continuity ties, with corresponding pairs mounted on co-planar mounting surfaces and each pair mounted on opposite mounting surfaces of the building structural members.

For a fuller understanding of the nature and advantages of the invention, reference should be had to the ensuing detailed description, taken in conjunction with the accompanying drawings.

DETAILED DESCRIPTION OF THE PREFERRED EMBODIMENTS

Figures 1, 2:
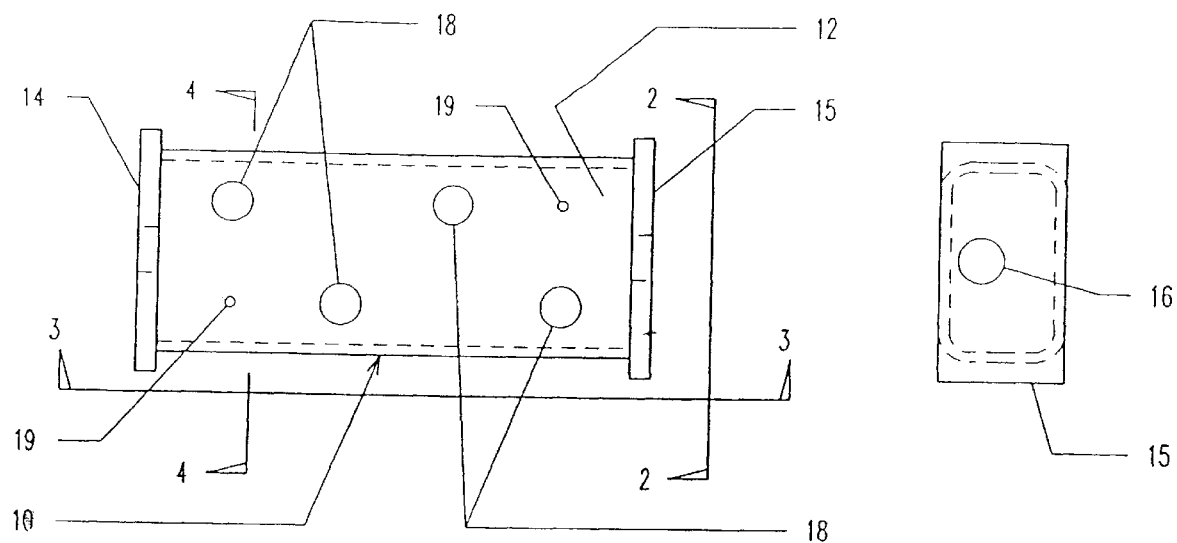
FIG. 1 is a front elevational view of the first embodiment of the invention.
FIG. 2 is an end view of the embodiment of FIG. 1 taken along lines 2—2 of FIG. 1.

Turning now to the drawings, FIGS. 1–4 illustrate a first embodiment of the invention. As seen in these figures, the first embodiment of the invention comprises a continuity tie generally designated with reference numeral 10 and includes a tubular central body member 12 fabricated from a strong and durable material such as structural tube steel having a wall thickness in the range from about 0.1345 in. (10 gauge) to about 0.50 in. A pair of mounting platforms or end plates 14, 15 are secured at opposite ends of central body member 12 by any suitable means, such as tack welding. Each end plate 14, 15 is provided with an offset aperture 16 for receiving a tension rod in the manner described more fully below.

The front wall 13 and back wall 17 of the central body member 12 are each provided with a plurality of bolt holes 18 for accommodating mounting bolts used to secure the continuity tie 10 to a building structural member as described more fully below. As best seen in FIG. 1, bolt holes 18 are arranged in a staggered pattern to reduce the probability that all bolts will align along a defect in the building structural member (usually made of wood) to which the continuity tie 10 is to be attached.

Continuity tie 10 is also provided with smaller fastener holes 19 for tacking the continuity tie 10 in place during installation.

Figures 3, 4:
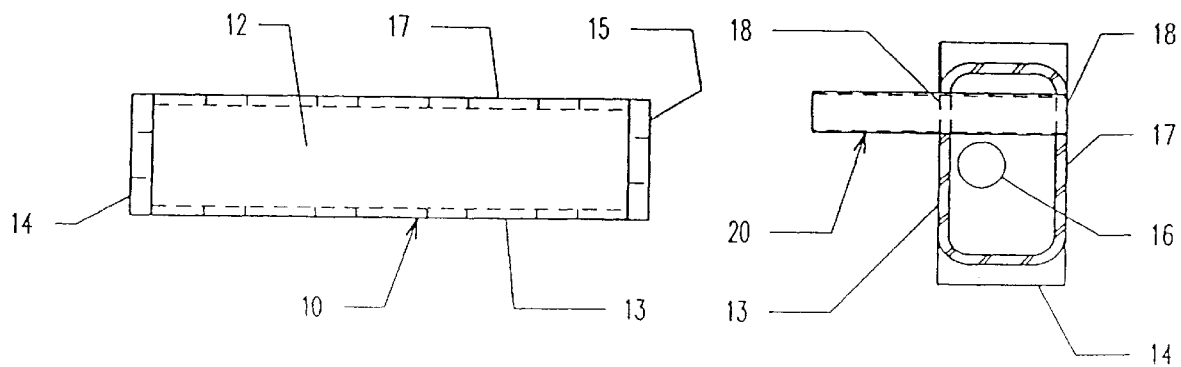
FIG. 3 is a sectional view taken along lines 3—3 of FIG. 1.
FIG. 4 is a sectional view taken along lines 4—4 of FIG. 1 illustrating the use of a drill pilot tube.

As best shown in FIG. 4, an accessory drill pilot tube 20 has an outer diameter sized to be snugly received within the bolt holes 18 in opposing faces 13, 17 of continuity tie 10 in order to provide a precision drill guide for forming the bolt holes in the building structural member.

Figure 5:
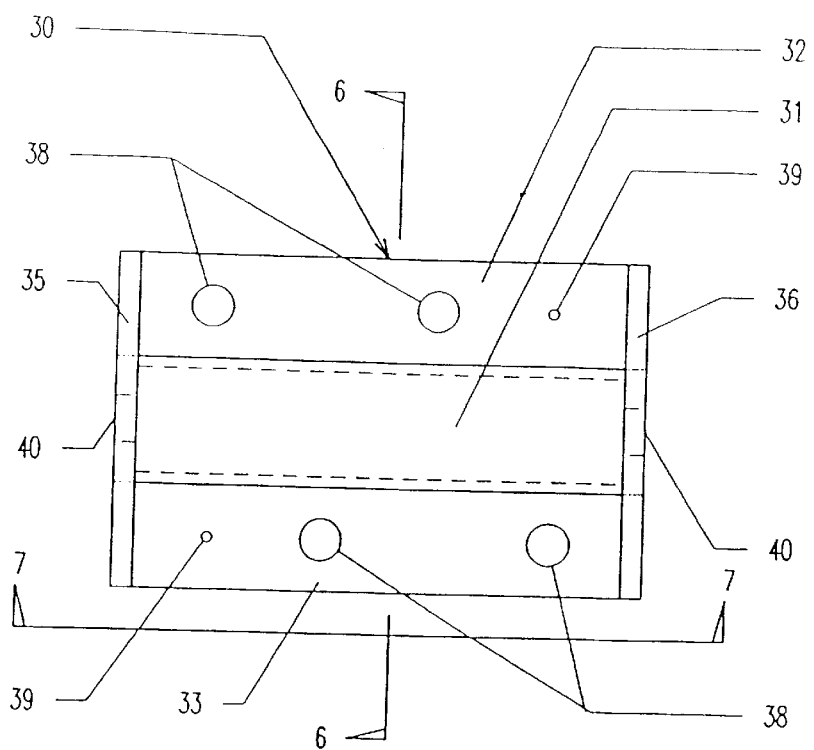
FIG. 5 is a front elevational view of an alternate embodiment of the invention.
Figure 6:
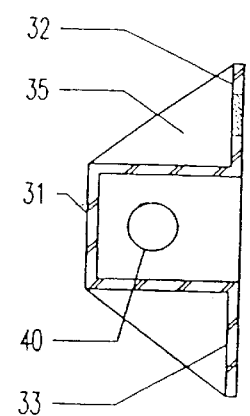
FIG. 6 is a sectional view taken along lines 6—6 of FIG. 5.
Figure 7:
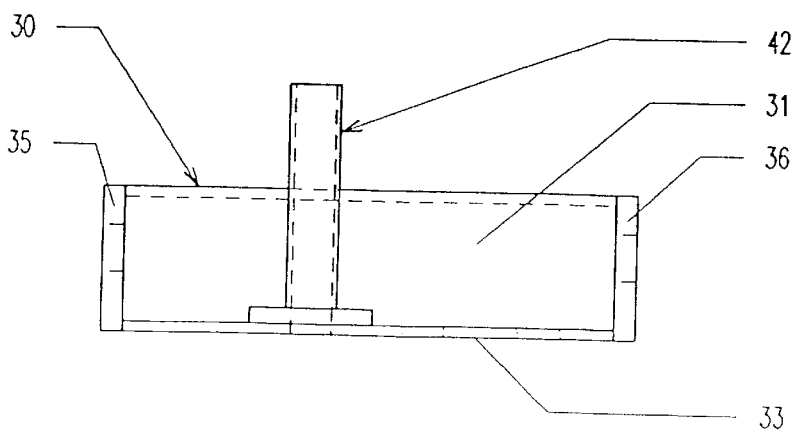
FIG. 7 is a sectional view taken along lines 7—7 of FIG. 5 illustrating the use of a drill pilot tube.

FIGS. 5–7 illustrate an alternate embodiment of the invention in which the central body member has an open wall configuration. As seen in these figures, continuity tie 30 includes a central body member 31 having a U-shaped central wall portion and a pair of flange portions 32, 33. A pair of end plates 35, 36 having an appropriate configuration, such as the trapezoidal shape illustrated, are secured to opposite ends of central body member 31 by any suitable means, such as tack welding. Flange portions 32, 33 are provided with staggered bolt apertures 38 and smaller fastener apertures 39 for the same purposes as those described above with reference to continuity tie 10. End plates 35, 36 are provided with offset apertures 40 for receiving a threaded rod described below. An accessory drill pilot tube 42 similar to drill pilot tube 20 is provided for the purpose of providing a precision guide for drilling bolt holes in the building structural member to which the continuity tie 30 is to be attached.

Figure 8:
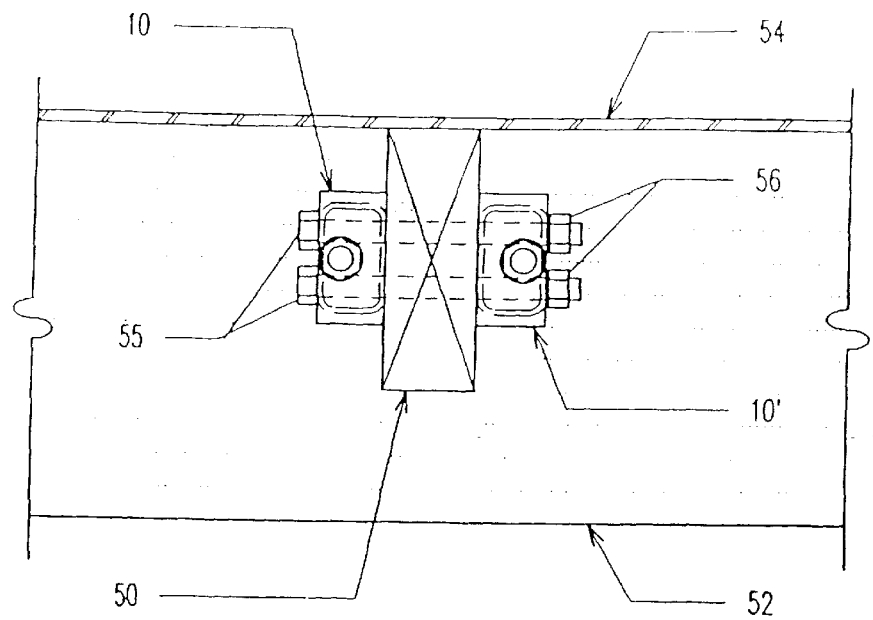
FIG. 8 is an end view illustrating a double sided installation of the embodiment of FIG. 1.
Figure 9:
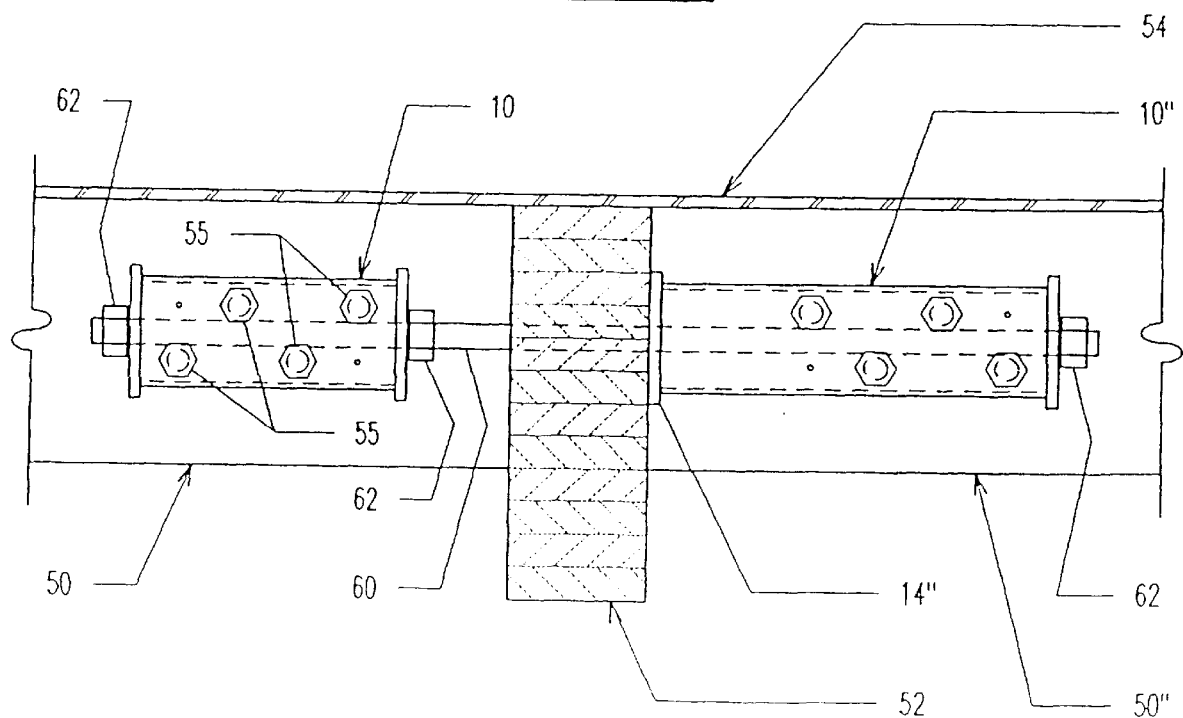
FIG. 9 is a side elevational view illustrating both a bearing and non-bearing application of the embodiment of FIG. 1.

FIGS. 8 and 9 illustrate the manner in which the continuity tie 10 illustrated in FIGS. 1–4 is installed on building structural members in order to tie two members together in a rigid connection which is resistive to both tension and compression. FIG. 8 is an end view illustrating a double sided connection: i.e., one in which one pair of continuity ties 10 is secured to a pair of building structural members on one common side and another pair is secured to the same pair of building structural members on the opposite common side. As seen in this figure, a first continuity tie 10 is mounted to a building structural member 50, such as a purlin, in a building structure having a large support beam 52 (such as a glu-lam beam) and a roof sheathing 54 fabricated from a suitable material such as plywood. A second continuity tie 10' is positioned on the opposite surface of building member 50, and the two continuity ties 10, 10' are secured together by means of bolts 55 and nuts 56. Bolts 55 pass through bolt holes formed in building member 50 using the bolt holes 18 and drill pilot tube 20 (FIGS. 1 and 4) to accurately guide a suitable drill bit through the building support member 50. In the configuration illustrated in FIG. 8, the continuity ties 10, 10' are arranged with the offset rod aperture 16 positioned away from the confronting surface of building support member 50.

As best shown in FIG. 9, continuity tie 10' is rigidly connected to another continuity tie 10" secured to another building structural member 50" positioned on the opposite side of support beam 52 from building member 50. A rod 60 is rigidly secured within rod apertures 16 of continuity tie 10' by means of a pair of nuts 62 threaded onto rod 60. In the configuration illustrated in FIG. 9, additional continuity tie 10" is a modified version of continuity tie 10 in which the end plate 14" bears against the confronting surface of support beam 52. In this application, only one nut 62 is required for threaded rod 60. In applications in which the continuity ties do not bear against the intervening beam 52 or other building support member, rod 60 is rigidly secured within each continuity tie by means of a pair of nuts located at each end in a manner substantially identical to that described above with reference to continuity tie 10.

As noted above, FIGS. 8 and 9 illustrate use of the continuity tie 10 illustrated in FIGS. 1–4 in a double sided installation. Continuity tie 10 may also be employed in a single sided installation in which a pair of continuity ties 10 are mounted on the common sides of the building structural members 50, 50" without a corresponding pair of continuity ties 10 on the opposite common sides of building structural members 50, 50". In the single sided application, bolts 55 pass through the bolt holes 18 formed in the front 13 and rear 17 wall surfaces of each continuity tie 10, through corresponding holes (unnumbered) formed in the building structural members 50, 50", and nuts 56 are secured to the distal end of each bolt 55 on the opposite side surface of the building structural members 50, 50". Preferably, a thrust washer or thrust plate is positioned between each nut 56 and the opposite side of building structural members 50, 50".

Installation of the continuity tie 30 illustrated in FIGS. 5–7 is substantially similar to that described above with reference to the continuity tie 10 of FIGS. 1–4. However, continuity tie 30 may only be mounted with flanges 32, 33 in engagement with the building structural member. In contrast, continuity tie 10 can be mounted with either front wall 13 or back wall 17 of central body member 12 engaging the building structural member. Thus, with reference to FIG. 2, continuity tie 10 may be mounted with threaded rod aperture 16 in either closest proximity to the building structural member or at the greatest distance away from the surface of the building structural member. It is preferable to mount continuity tie 10 to the surface of the building structural member with threaded rod aperture 16 in closest proximity to the surface of the building structural member in order to reduce the moment arm between threaded rod 60 and the building structural member 50 to a minimum. In some installations, ancillary intervening hardware interferes with or mechanically obstructs threaded rod 60. In such installations, continuity tie 10 is oriented with the threaded rod aperture 16 at the maximum distance from the building structural member mounting surface. As will be appreciated by those skilled in the art, this is easily accomplished by simply orienting the continuity tie 10 so that front wall 13 contacts the building structural member before tacking the continuity tie 10 to the building structural member using fasteners (such as nails) passing through the smaller fastener holes 19 prior to drilling the bolt holes.

Figure 10:
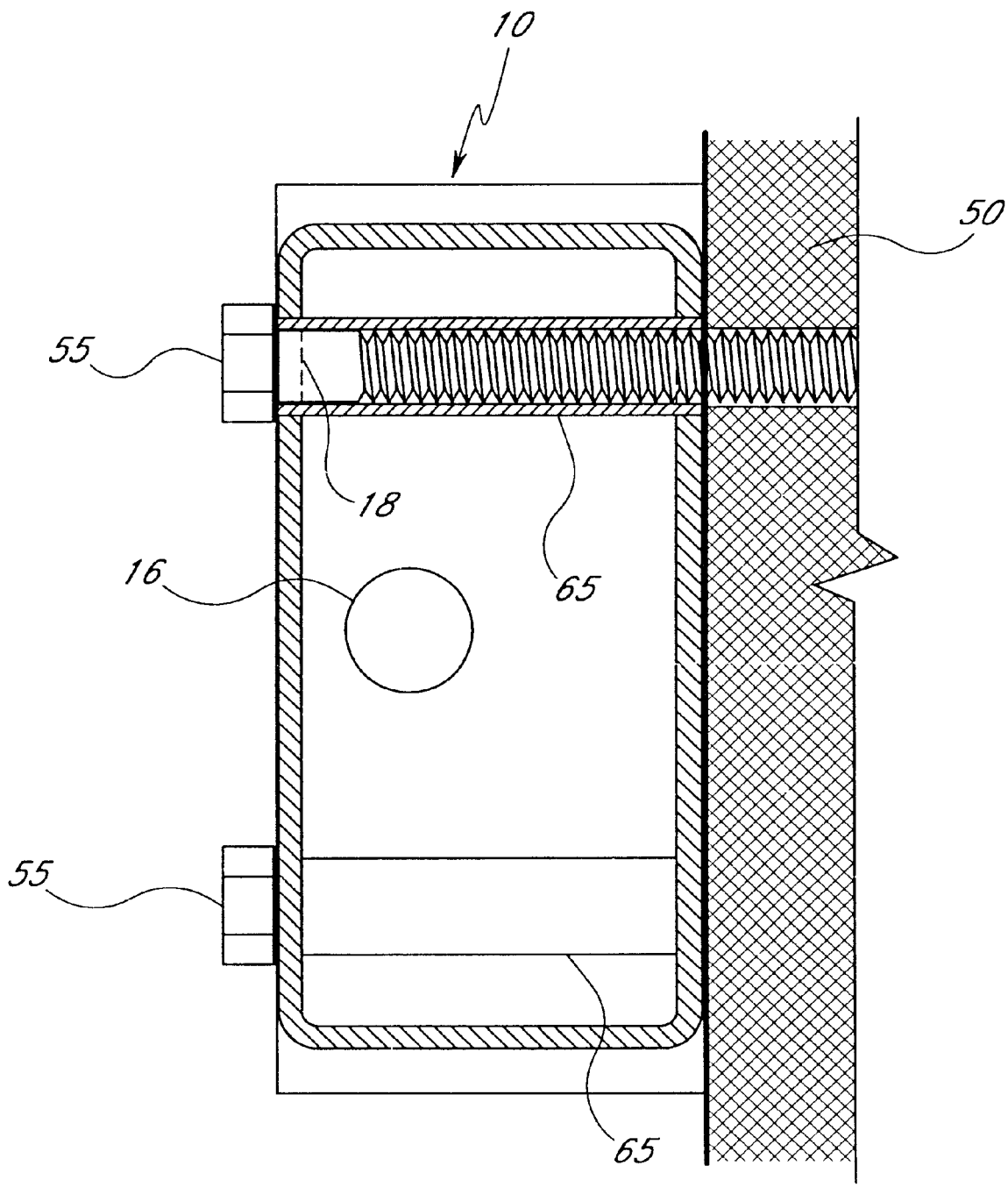
FIG. 10 is a sectional view similar to FIG. 4, illustrating the use of bolt spacer.

As noted above, when forming the bolt holes in building members 50, 50', 50", drill pilot tube 20 is inserted through the bolt holes 18 in continuity tie 10 (and drill pilot 42 is used in combination with continuity tie 30). Since each drill pilot 20, 42 must have an outer diameter slightly less than the inner diameter of the bolt holes 18, 38 formed in the continuity ties 10, 30, the drill bit used to form the holes in the building structural members must necessarily have a smaller outer diameter than the inner diameter of the bolt holes 18, 38. As a consequence, the outer diameter of the mounting bolts 55 will necessarily be less than the inner diameter of the bolt holes 18, 38. In order to reduce this clearance space to a minimum, a tubular spacer 65 (see FIG. 10) having the same outer diameter as the bolt holes 18, 38 and a slightly larger inner diameter than the outer diameter of the bolts 55 can be installed in the bolt holes 18 of continuity tie 10. Such a spacer reduces to a minimum the clearance between the bolts 55 and the surrounding continuity tie material in order to minimize potential movement of the continuity tie 10 in a direction perpendicular to the axis of the bolts 55 in response to external seismic or wind forces. A similar spacer may be used in the hole formed in the building structural member to minimize lateral bolt movement therein.

As will now be apparent, the invention affords several advantages over holdown devices known in the art and used to create a strengthened continuity tie system for a building. Firstly, the invention experiences limited device deflection in response to tensile or compressive forces along the threaded rod, due to the structural and functional design of the continuity tie. In addition, in the invention, the force couple restraint associated with the load transfer mechanism between the continuity tie and the building structural element to which the continuity tie is attached is generally resisted by the continuity tie itself and not by the building structural element. This force couple restraint is provided by the inside and outside walls of the continuity tie acting on the bolts. This method of force couple resistance significantly reduces the bearing stresses at the loaded end of the bolts 55 between the bolt and the building structural element, particularly in single sided installations, and increases the overall capacity of the device. For a discussion of the considerations applying to bolt restraint, see the 1991 edition of the National Design Standard for Wood Construction (1991 NDS), especially sections 8.1 through 8.5, and Appendix sections I.1 through I.3, and section 2336 of the 1994 edition of the Uniform Building Code (1994 UBC), which are hereby incorporated by reference. The staggered bolt holes 18, 38 afford the advantage of reducing the possibility that all of the mounting bolts might be located on or near a defect in a building structural element, particularly one made from timber. Also, the bolt hole patterns provide a substantial amount of rotational restraint capacity which decreases the possibility of mechanical failure of the continuity tie due to eccentric forces. In addition, the offset location of the rod apertures 16 in continuity tie 10 enables the continuity tie 10 to be mounted with the tension rod closely adjacent to the structural building element which significantly reduces the force couple between the continuity tie and the building structural element and thus increases the capacity of the continuity tie and the timber or building structural element to which it is attached. In addition, the invention significantly limits reliance on any structural welds, which are typical weak points in mechanical elements and are subject to quality control requirements which are often costly to meet. Further, the invention provides both compression bearing capacity as well as tension resisting capacity. Further, the accessory drill pilot tube 20, 42 provides a precision guide for accurately drilling the bolt holes through the building structural element. This process is facilitated by the fastener holes which enable the continuity tie to be tacked in place and held sufficiently when the bolt holes are being formed. Lastly, the symmetrical configuration of continuity tie 10 eliminates the possibility that the device might be installed backwards.

While the above provides a full and complete disclosure of the preferred embodiment of the invention, various modifications, alternate constructions and equivalents may be employed without departing from the true spirit and scope of the invention. Therefore, the above should not be construed as limiting the scope of the invention, which is defined by the appended claims.

What is claimed is:

1. A continuity tie system for securing together a pair of building elements including an elongated beam, the system comprising:
    a longitudinal tube including a front wall and a pair of side walls longitudinally extending between two opposing ends, the front and side walls defining a channel along the length of the tube;
    a plurality of fasteners extending laterally through the tube and into a side surface of the elongated beam, thereby securing the tube directly to the elongated beam;
    a mounting platform integrally attached to and extending laterally across the channel proximate one of the opposing ends; and
    a tie member attached to and extending longitudinally from the mounting platform.

2. The continuity tie system of claim 1, wherein the fasteners are distributed laterally to either side of a tie member axis.

3. The continuity tie system of claim 1, wherein the tube further comprises a back wall extending between the side walls and the fasteners extend through the front and back walls.

4. The continuity tie of claim 1, wherein the tube further comprises a pair of flange portions extending from the side walls away from the channel and the fasteners extend through the flanges.

5. A method of securing a first building element to a second building element, comprising:
    providing a tubular continuity tie defining a longitudinal channel extending between a first end and an opposing second end, the continuity tie further including a mounting platform proximate the first end of the channel;
    securing the continuity tie to a surface of the first building element with the longitudinal channel extending parallel to the surface and the continuity tie spaced from the second building element;
    securing a first end of a tie member directly to the mounting platform;
    extending the tie member longitudinally from the mounting platform; and
    connecting a second end of the tie member to the second building element.

6. The method of claim 5, wherein the tie member comprises a threaded rod.

7. The method of claim 5, wherein securing the first end of the tie member comprises extending the tie member through an aperture in the mounting platform.

8. The method of claim 5, wherein connecting the second end of the tie member to the second building element comprises securing the second end of the tie member directly to a second continuity tie and securing the second continuity tie directly to the second building element.

9. The method of claim 5, wherein the continuity tie comprises an open U-shaped section defining the longitudinal channel.

10. The method of claim 9, wherein the U-shaped section is flanked by two flanges extending laterally from the channel.

11. The method of claim 5, wherein the continuity tie comprises a tubular channel.

12. A system for securing together a pair of structural building members, the continuity tie comprising:
    a central body member having a longitudinal front wall and a pair of longitudinal side walls extending from the front wall to define a longitudinal channel, the body member having a plurality of fasteners extending laterally therethrough and securing the body member to a surface of one of the structural building members;
    at least one mounting platform secured to each of the front and side walls, the mounting platform extending across the longitudinal channel; and
    a tie member attached to the mounting platform parallel to the longitudinal channel.

13. The system of claim 12, wherein the central body member comprises an open center U-shaped region defining the longitudinal channel.

14. The system of claim 13, wherein the central body member further comprises a pair of flanges portions flanking the center U-shaped region.

15. The system of claim 14, wherein the open portion of the U-shaped region is enclosed by the surface of one of the structural building members.

16. A continuity tie system for securing together a pair of structural building elements including an elongated beam and a second structural building element, the system comprising:
    a member defining a channel proximate the center of the member extending longitudinally along the length of the member;
    a plurality of fasteners extending laterally through the longitudinal member and into a side surface of the elongated beam, thereby securing the member directly to the elongated beam; and
    a tie member fastened to the member and extending longitudinally from the member and fastened to the second structural building element.

17. The continuity tie system of claim 16, further comprising a mounting platform integrally attached to and extending laterally across the channel proximate one of the opposing ends, the tie member fastened to the mounting platform.

18. The continuity tie system of claim 16, wherein the fasteners are distributed laterally to either side of a tie member axis.

19. A method of securing a first building element to a second building element, comprising:
    providing a continuity tie defining a longitudinal axis extending between a first end and an opposing second end;
    securing the continuity tie to a surface of the first building element with the longitudinal axis extending parallel to the surface and the continuity tie spaced from the second building element;
    extending the tie member longitudinally through the continuity tie;
    securing a first end of a tie member directly to the first end of the continuity tie; and connecting a second end of the tie member to the second building element.

20. The method of claim 19, wherein securing the first end of the tie member comprises fixing the first end of the tie member to a mounting platform of the continuity tie proximate the first end.

21. The method of claim 19, wherein the tie member comprises a threaded rod.

22. The method of claim 19, wherein securing the first end of the tie member comprises extending the tie member through a longitudinal channel of the continuity tie.

23. The method of claim 19, wherein connecting the second end of the tie member to the second building element comprises securing the second end of the tie member directly to a second continuity tie and securing the second continuity tie directly to the second building element.

24. A continuity tie system for securing together an elongated beam and a second structural building element, the system comprising:

a channel-defining member including a front wall and a pair of side walls longitudinally extending between two opposing ends, the front and side walls defining a channel along the length of the channel-defining member;

a plurality of fasteners extending laterally through the channel-defining member and into the elongated beam, thereby securing the elongated beam directly to the channel-defining member;

a mounting platform integrally attached to and extending laterally across the channel proximate one of the opposing ends; and a tie member attached to and extending longitudinally from the mounting platform and connected to the second building structural element.

25. The continuity tie system of claim 24, wherein the fasteners are distributed laterally to either side of a tie member axis.

26. The continuity tie system of claim 24, wherein the channel-defining member further comprises a back wall extending between the side walls and the fasteners extend through the front and back walls.

27. A method of securing a first building element to a second building element, comprising:

providing a tubular continuity tie defining a longitudinal channel extending between a first end and an opposing second end, the continuity tie further including a mounting platform proximate the first end of the channel;

securing the continuity tie to the first building element with the longitudinal channel extending parallel to the longitudinal axis of the first building element and the continuity tie spaced from the second building element;

securing a first end of a tie member directly to the mounting platform;

extending the tie member longitudinally from the mounting platform; and connecting a second end of the tie member to the second building element.

28. The method of claim 27, wherein the tie member comprises a threaded rod.

29. The method of claim 27, wherein securing the first end of the tie member comprises extending the tie member through an aperture in the mounting platform.

30. The method of claim 27, wherein connecting the second end of the tie member to the second building element comprises securing the second end of the tie member directly to a second continuity tie and securing the second continuity tie directly to the second building element.

* * * * *